March 12, 1957 B. COOPER 2,784,911
TREADLE CONTROLLED TOLL CHECKING SYSTEMS
Filed April 27, 1950
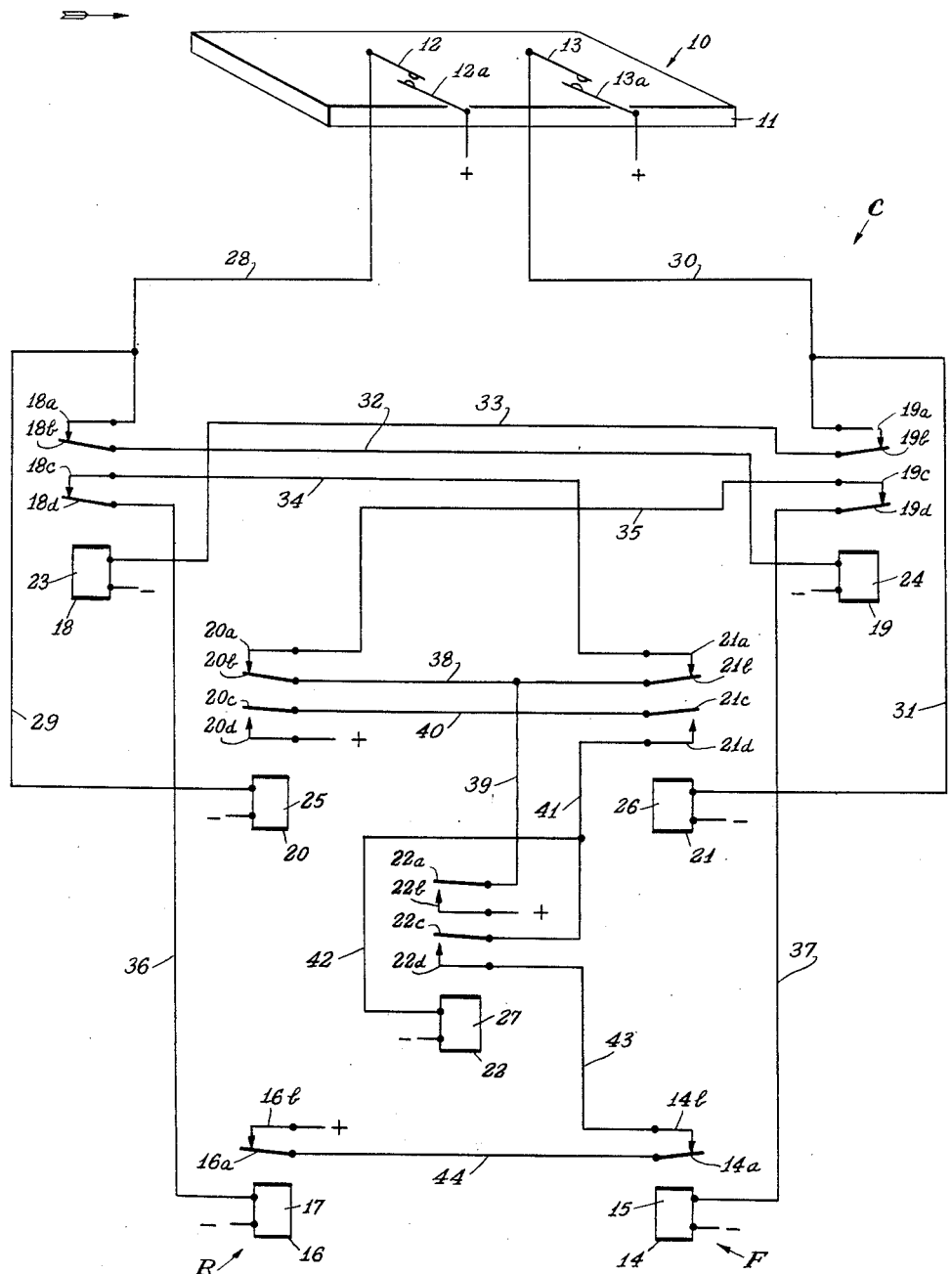
INVENTOR.
BENJAMIN COOPER
BY
*J. B. Felshin*
ATTORNEY.

United States Patent Office 2,784,911
Patented Mar. 12, 1957

2,784,911

TREADLE CONTROLLED TOLL CHECKING SYSTEMS

Benjamin Cooper, New York, N. Y.

Application April 27, 1950, Serial No. 158,491

8 Claims. (Cl. 235—99)

This invention relates to a treadle controlled system for operating electrical printing counters and the like devices.

It is usual, in toll checking systems, to employ a multi-switch treadle connected with a circuit operative to energize forward and reverse electrical printing counters so that a count is added to the forward counter when a vehicle axle moves over the treadle in one direction and a count is added to the reverse counter each time a vehicle axle passes over the treadle in the opposite direction. Such a system employing a four-switch treadle is shown and described in applicant's Patent No. 2,313,627, titled Treadle Controlled Toll Checking System, issued March 9, 1943.

The present invention provides an improved toll checking system comprising a two-switch treadle which, though very much simpler and less expensive than the complicated four-switch treadle circuit, at the same time embodies its most important features.

Accordingly, one feature of the invention resides in the provision of a toll checking system of the character described having two electric counters, a two-switch treadle, and including means to count axles of vehicles on one of the counters when the wheels of the vehicle roll over the treadle in one direction, and means to count axles of vehicles on the other counter when the wheels of vehicles roll over the treadle in an opposite direction, the system being such as to count the axles on the proper counter responsive to direction of movement of the vehicles.

Vehicles mounting the treadle often stop while the wheels thereof are still on the treadle and due to vibration caused by the running motor oscillate back and forth, whereby the wheels roll rearwardly and forwardly while still in contact with the treadle. Another feature of the invention accordingly resides in the provision of a toll checking system of the character described having means to prevent an erroneous count of vehicle passage over the treadle, should the wheels of a vehicle passing onto the treadle cause alternate actuation of the two treadle switches, by oscillating or rolling slightly backward and forward while on the treadle, and subsequently roll off the treadle in one direction or the other.

Another feature of the invention resides in the provision of a toll checking system of the character described having means to prevent either of the forward or reverse counters from being actuated should the wheels of a vehicle passing onto the treadle cause intermittent actuation of one of the treadle switches, by oscillating or rolling slightly backward and forward while partly on the treadle, and subsequently back off the treadle.

Another feature of this invention resides in the provision of means for preventing complete inoperation of the toll checking system in case of accidental or deliberate shorting of one or the other of the treadle switches, as by the placement of a weight on the treadle. In the present invention if one of the treadle switches is shorted, one of the counting relays will count axle passage, irrespective of direction of passage, and if the other treadle switch is shorted, the other counting relay will count axle passage, irrespective of direction of passage. With this provision, and with the knowledge of average forward and reverse treadle counts in the lane, it can readily be determined to within a small degree of error the actual forward and reverse axle passage counts over the shorted treadle.

Still another feature of the invention resides in the provision of a toll checking system of the character described having two electric counters and a two-switch treadle, and including auxiliary means to energize the electric counters so that they are positively actuated in response to vehicle passage over the treadle even though said vehicle passage is at a high rate of speed.

Other features and objects of this invention will in part be obvious and in part hereinbelow pointed out.

The invention accordingly consists in the combination of elements and arrangement of parts which will be exemplified in the construction hereinbelow described and of which the scope of application will be indicated in the appended claims.

In the accompanying drawing, in which is shown one of the various possible embodiments of this invention, the single figure of the drawing is a diagrammatic representation of a system embodying the invention.

Referring now in detail to the drawing, 10 designates a treadle which may be embedded in a roadway, transversely thereof, and which is adapted to be traversed by vehicles passing over the roadway. The treadle 10 may be constructed substantially as shown and described in applicant's Patent No. 2,251,351, titled Treadle Process, issued August 5, 1941, with the exception that there be only two treadle switches instead of four. The same may comprise a rubber block or casing 11 in which are mounted two pairs of elongated, parallel contacts 12, 12a; and 13, 13a. Said pairs of contacts constitute switches which are normally open but which are closed and opened successively as the wheels of a vehicle pass over the treadle. The contacts 12a and 13a are connected to the plus side of an electric power supply. Preferably, the switches are spaced apart not more than three inches so that as the front or rear wheels of a vehicle pass over the treadle the switch 12, 12a is first closed and as the wheels advance, the switch 13, 13a also closes. As the wheels continue to advance the switch 12, 12a opens and, as the wheels roll off the treadle, the switch 13, 13a opens. Thus one switch does not open until after the adjacent switch closes, so that both switches are simultaneously closed for an instant as a pair of wheels moves over the treadle.

The switches are connected in a circuit C so arranged, as will appear hereinbelow, that the operation of the treadle in the direction indicated on the drawing, from left to right, will actuate a counter F termed the forward counter, while the wheels of a vehicle rolling over the treadle in the opposite direction will actuate a second counter R termed the rearward counter.

The forward counter F comprises a relay 14 having a coil 15, one terminal of which is connected to the minus side of the power supply. Said relay 14, when energized is adapted to open a switch arm 14a, which is normally in engagement with fixed contact 14b.

The rearward counter R comprises a relay 16 having a coil 17, one terminal of which is connected to the minus side of the power supply. Said relay 16 when energized, is adapted to open a switch arm 16a, which is normally in engagement with fixed contact 16b.

The circuit C comprises five relays designated by numerals 18, 19, 20, 21 and 22. Said relays are provided with windings 23, 24, 25, 26 and 27, respectively, each of which has one terminal connected to the minus side of the power supply.

Associated with relay 18 are switch arms 18b and 18d. Switch arm 18b is normally in engagement with fixed contact arm 18a and adapted to be moved to break contact with said fixed contact arm when relay 18 is energized. Switch arm 18d is normally in engagement with fixed contact arm 18c, and adapted to be moved to break contact with said fixed contact arm when relay 18 is energized.

Associated with relay 19 are switch arms 19b and 19d. Switch arm 19b is normally in engagement with fixed contact arm 19a and adapted to be moved to break contact with said fixed contact arm when relay 19 is energized. Switch arm 19d is normally in engagement with fixed contact arm 19c, and adapted to be moved to break contact with said fixed contact arm when relay 19 is energized.

Associated with relay 20 is a switch arm 20b, normally in contact with fixed contact arm 20a, and adapted to be open-circuited when said relay is energized. There is further associated with relay 20 a switch arm 20c, normally open-circuited, but adapted to move into engagement with fixed contact arm 20d when said relay is energized.

Associated with relay 21 is a switch arm 21b, normally in contact with fixed contact arm 21a, and adapted to be open-circuited when said relay is energized. There is further associated with relay 21 a switch arm 21c, normally open-circuited, but adapted to move into engagement with fixed contact arm 21d when said relay is energized.

Relay 22 has associated with it a pair of switch arms 22a and 22c, normally open-circuited, but adapted to move into engagement with fixed contact arms 22b and 22d, respectively, when said relay is energized.

Contact 12 is connected by wire 28 to fixed contact arm 18a and by wires 28 and 29 to the remaining terminal of winding 25 associated with relay 20. Contact 13 is connected by wire 30 to fixed contact arm 19a and by wires 30 and 31 to the remaining terminal of winding 26 associated with relay 21.

Switch arm 18b is connected as by wire 32 to the remaining terminal of winding 24 associated with relay 19, and switch arm 19b is connected as by wire 33 to the remaining terminal of winding 23 associated with relay 18.

Fixed contact arm 18c is connected as by wire 34 to fixed contact arm 21a; and fixed contact arm 19c is connected as by wire 35 to fixed contact arm 20a.

Switch arm 18d is connected as by wire 36 to the remaining terminal of coil 17 associated with rearward counter R; and switch arm 19d is connected as by wire 37 to the remaining terminal of coil 15 associated with forward counter F.

Switch arm 20b is connected as by wire 38 to switch arm 21b, both of which are connected as by wires 38 and 39 to switch arm 22a. Switch arm 20c is connected as by wire 40 to switch arm 21c. Fixed contact arms 20d and 22b are connected to the plus side of the power supply.

Fixed contact arm 21d is connected as by wire 41 to fixed contact arm 22c and also, as by wires 41 and 42, to the remaining terminal of coil 27 associated with relay 22.

Fixed contact arm 22d is connected as by wire 43 to fixed contact arm 14b. Switch arms 14a and 16a are interconnected as by wire 44. Fixed contact arm 16b is connected to the plus side of the power supply.

When the wheels of a vehicle roll over treadle 10 from left to right, in the direction indicated in the drawing, switch 12, 12a will first close, energizing relays 19 and 20. The completed energization circuit for relay 19 is from the plus side of the source of potential through switch 12, 12a, wire 28, normally closed switch 18a, 18b, wire 32 and the coil 24 to the minus side of the source of potential. The completed energization for relay 20 is from the plus side of the source of potential through switch 12, 12a, wires 28 and 29 through coil 25 to the minus side of the source of potential. The energization of relay 19 will open switches 19a, 19b, and 19c, 19d. The energization of relay 20 will open its switch 20a, 20b, and close switch 20c, 20d.

When switch 13, 13a is thereafter closed by the wheels of the vehicle, while switch 12, 12a is still closed, relay 21 will be energized by the completed circuit from the plus side of the source of potential through switch 13, 13a, wires 30 and 31, through coil 26 to the minus side of the source of potential. It should be noted that since switch 19a, 19b is now open, relay 18 will not become energized. The energization of relay 21 will in turn complete an energization circuit for relay 22, said circuit being from the plus side of the source of potential through now closed switch 20c, 20d, wire 40, now closed switch 21c, 21d, wires 41 and 42, through coil 27 of relay 22 to the minus side of the source of potential. The consequent closure of switch 22c, 22d will complete a secondary holding circuit for relay 22 through the switches associated with the forward and rearward counters F and R. This holding circuit can be traced from the plus side of the source of potential through normally closed switch 16a, 16b, wire 44, normally closed switch 14a, 14b, wire 43, now closed switch 22c, 22d, wires 41 and 42 through coil 27 to the minus side of the source of potential. It is now evident that once said holding circuit is completed, relay 22 will remain actuated until the opening of either of the switches 14a, 14b, or 16a, 16b, which will occur when either the forward or rearward counter is energized to register a count.

When the wheels of the vehicle move forwardly further so as to open switch 12, 12a, switch 13, 13a still being held closed, the above detailed energization circuits to relays 19 and 20 will be opened. Consequently, a circuit will be completed to energize forward counter F, said circuit being from the plus side of the source of potential through now closed switch 22a, 22b, wires 39 and 38, normally closed switch 20a, 20b, wire 35, normally closed switch 19c, 19d, wire 37, through coil 15 associated with forward counter F to the minus side of the source of potential. The energization of counter F will, as detailed above, open-circuit the holding circuit for relay 22, thereby deenergizing it.

As the vehicle passes off the treadle, having registered a forward count, switch 13, 13a is opened, relays 18 and 21 are deenergized, and the system is in readiness for subsequent counting of vehicle passage.

If, instead of the vehicle passing off the treadle, it moves rearwardly again, closing switch 12, 12a, and then opening switch 13, 13a, a rearward count will be registered upon the opening of switch 13, 13a. Thus, the closure of switches 12, 12a, and 13, 13a, will complete the energization and holding circuits to relay 22 as above. Upon the opening of switch 13, 13a the energization circuit for rearward counter R will be completed, said circuit being from the plus side of the source of potential through now closed switch 22a, 22b, wires 39 and 38, normally closed switch 21a, 21b, wire 34, normally closed switch 18c, 18d and wire 36 through coil 17 associated with rearward counter R. Here again the energization of counter R opens the holding circuit to relay 22 and the system is in readiness for further counting.

It is now evident that even though a vehicle should move back and forth on the treadle, alternately actuating its switches any number of times before passing off the treadle, the difference between the number of counts on the rearward and forward counters will be correct tally of the number of axles that have passed over the treadle in the forward direction.

It should be noted that if a vehicle merely moves on the treadle so as to actuate switch 12, 12a and then vibrate so as to cause intermittent actuation of said switch, and subsequently moves backwardly off the treadle without having actuated the second treadle switch 13, 13a at all, no count will be registered. This is evident, since the actuation of switch 12, 12a merely energizes relays 19 and 20, without effecting the energization of relay 22, which, as detailed above, is prerequisite to the operation of the counters.

Since the circuit C is symmetrical, relay 18 corresponding to relay 19, and relay 20 corresponding to relay 21, it is clear that if a vehicle should roll over the treadle in the opposition or rearward direction, the circuit would operate to actuate and add a count on rearward counter relay R. Likewise, corresponding results obtain for the above conditions of roll-back detailed with respect to forward operation, when applied from the rearward side of the treadle.

In ordinary two-contact treadle toll checking systems that are sensitive to direction of travel over the treadle, the systems are rendered entirely inoperative when one or the other of the treadle switches is shorted. In the present invention, means is provided to count axle passage over such a shorted treadle on one or the other of the counters, the particular counter operating depending upon which of the treadle switches is shorted.

Assume that treadle switch 12, 12a is shorted. Relays 19 and 20 will consequently be energized and actuate their associated switches as hereinabove detailed. Assume now that a vehicle passes on the treadle and closes switch 13, 13a. Under this condition a circuit is completed energizing relay 21, and, consequently, relay 22 is energized and its holding circuit completed. Upon the subsequent opening of switch 13, 13a when the wheel passes over the treadle, relay 21 will become deenergized and a circuit will be completed to energize the rearward counter R to register a count. This circuit can be traced from the plus side of the source of potential through wires 39 and 38, normally closed switch 21a, 21b, wire 34 normally closed switch 18c, 18d, wire 36 and through coil 17 associated with counter R to the minus side of the source of potential.

If treadle switch 13, 13a were shorted instead of 12, 12a, treadle passage counts would similarly be registered on the forward counter F. Because of the symmetry of the circuit, the detailed operation would of course be analogous to that above described.

It should be particularly noted that the counter relays R and F are not energized directly through the treadle switches, but through switches associated with the auxiliary relays. Since the counter relays are relatively slow in operation, this is important. Otherwise, in a circuit wherein a counter is energized directly by the treadle switch, a car moving over the treadle at a high rate of speed might not close the circuit long enough for the counter relay to be actuated. It is evident that the counter relays, having their energization circuit controlled by self-operated switches, must remain energized for a sufficient length of time to complete a counting operation, thereby insuring positive counting action.

It will thus be seen that there is provided a system in which the several objects of this invention are achieved and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention, I claim as new and desire to secure by Letters Patent:

1. In combination with a treadle switch mechanism adapted to be placed on a roadway transversely thereof, consisting of a set of two elongated switches disposed parallel one to the other in spaced relation and adapted to be sequentially actuated to effect a concurrent actuated switch condition by the wheels of a vehicle rolling over the treadle mechanism, a forward counter and a rearward counter, a circuit connecting both counters with said switches, including means to actuate the forward counter when wheels of a vehicle rolling over the treadle mechanism actuate said switches sequentially in the sequential steps of closing one switch, closing the second switch and thereafter opening the first switch, and means to actuate the rearward counter when the wheels of a vehicle rolling over the treadle in an opposite direction actuate said switches in reverse sequence including the steps of closing the second switch, closing the first switch and thereafter opening the second switch, said circuit including means to actuate one of said counters upon a wheel rolling over the treadle and actuating and then releasing one of said switches if the other of said switches has been shorted.

2. In combination with a treadle adapted to be placed on a roadway transversely thereof, consisting of a set of two elongated switches side by side and adapted to be actuated by the wheels of a vehicle rolling over the treadle, a forward counter and a rearward counter, a circuit connecting both counters with said switches, including means to actuate the forward counter when wheels of a vehicle rolling over the treadle in one direction actuate said switches sequentially in the steps of closing one switch, closing the second switch and thereafter opening the first switch and means to actuate the rearward counter when the wheels of a vehicle rolling over the treadle in an opposite direction actuate said switches sequentially in the steps of closing the second switch, closing the first switch and thereafter opening the second switch, said circuit including means to actuate one of said counters upon a wheel rolling over the treadle and actuating one of said switches if the other of said switches has been shorted, and said circuit further including means to actuate the other counter upon actuating said other switch after shorting the first switch.

3. In combination with a treadle adapted to be imbedded in a roadway transversely thereof and consisting of a set of two elongated parallel switches disposed side by side less than three inches apart, whereby the wheels of a vehicle rolling over the treadle will first actuate the first switch, then actuate the second switch before the first switch is opened, then open the first switch, and then open the second switch, a forward counter and a rearward counter, a circuit connecting both counters with said switches, including means to actuate the forward counter when the wheels of a vehicle roll over the treadle in a forward direction and means to actuate the rearward counter when the wheels of a vehicle roll over the treadle in a rearward direction, said circuit including means to make a count on one of said counters when the wheels of a vehicle roll over the treadle in one direction upon one of said switches being shorted.

4. In combination with a treadle adapted to be imbedded in a roadway transversely thereof and consisting of a set of two elongated parallel switches disposed side by side less than three inches apart, whereby the wheels of a vehicle rolling over the treadle will first actuate the first switch, then actuate the second switch before the first switch is opened, then open the first switch, and then open the second switch, a forward counter and a rearward counter, a circuit connecting both counters with said switches, including means to actuate the forward counter when the wheels of a vehicle roll over the treadle in a forward direction and means to actuate the rearward counter when the wheels of a vehicle roll over the treadle in a rearward direction, said circuit including means to make a count on one of said counters when the wheels of a vehicle roll over the treadle in one direction upon one of said switches being shorted, and means to make a count on the other counter upon passage of the wheels of a vehicle over the treadle actuating the second switch upon shorting the first switch.

5. In combination, a treadle consisting of only two switches, a pair of electro-magnets associated with each switch, a circuit including said switches and said electro-magnets, and including means to actuate one pair of said electro-magnets upon closure of the first switch, means to actuate one electro-magnet of the other pair of said electro-magnets upon closure of the second switch while the first switch is still closed, a fifth electro-magnet, means to actuate said fifth electro-magnet upon actuation of the one electro-magnet that was actuated by said second switch, a forward counter, a rearward counter, means to selectively actuate one of said counters upon the de-actuation of said first pair of actuated electro-magnets, with the actuation of the respective counters being dependent upon the order of actuation of said switches.

6. In combination, a treadle consisting of only two switches, a pair of electro-magnets associated with each switch, a circuit including said switches and said pairs of electro-magnets, and including means to actuate one pair of said pairs of electro-magnets upon closure of the related switch, a fifth electro-magnet, means to actuate said fifth electro-magnet upon the actuation of one electro-magnet of said other pair of electro-magnets while the first pair of actuated electro-magnets are actuated, means to hold said fifth electro-magnet actuated upon actuation of said fifth electro-magnet, a forward counter, a rearward counter, means to selectively actuate said counters in accordance with the order of actuation and de-actuation of said switches, said last means responsive to the actuation of said fifth electro-magnet, and means actuable by the actuation of said counters to release said fifth electro-magnet holding means.

7. In combination with a treadle mechanism consisting of a set of two switches adapted to be closed in sequential order by the wheels of a vehicle rolling thereover, a forward counter and a rearward counter, a circuit connecting both counters with said switches, including means operable upon actuation of said switches in one direction in the sequential steps of closing one switch, closing the second switch, and subsequently opening the first switch, to actuate the forward counter, and operable upon actuation of said switches in the sequential steps of closing the second switch, closing the first switch, and opening the second switch, to actuate the rearward counter, said circuit including means to make a count on one of said counters upon the passage of wheels of a vehicle over said treadle while one of said switches is shorted.

8. In combination with a treadle switch mechanism consisting of a first switch, and a second switch, adapted to be closed in sequential order by the wheels of the vehicle rolling thereover, a forward counter and a rearward counter, a circuit connecting both counters with said switches, including means operable upon actuation of said switches sequentially in the direction from the first to the second switch including the steps of closing the first switch, closing the second switch, and then opening the first switch to actuate the forward counter, and operable upon actuation of said switches sequentially in the direction from the second to the first switch including the steps of closing the second switch, closing the first switch and then opening the second switch to actuate the rearward counter, said circuit including means to make a count on said rearward counter upon the passage of wheels of a vehicle over said treadle mechanism while the first of said switches is shorted.

References Cited in the file of this patent

UNITED STATES PATENTS

| | | |
|---|---|---|
| 2,046,157 | Gibbs | June 30, 1936 |
| 2,186,922 | Hampton et al. | Jan. 9, 1940 |
| 2,268,925 | Cooper | Jan. 6, 1942 |
| 2,313,627 | Cooper | Mar. 9, 1943 |
| 2,551,977 | Smith | May 8, 1951 |

FOREIGN PATENTS

| | | |
|---|---|---|
| 618,952 | Great Britain | Mar. 2, 1949 |